(12) United States Patent
Lee et al.

(10) Patent No.: US 10,371,965 B2
(45) Date of Patent: Aug. 6, 2019

(54) HYDROGEL CONTACT LENS HAVING WET SURFACE, AND MANUFACTURING METHOD THEREFOR

(71) Applicant: INTEROJO INC., Gyeonggi-do (KR)

(72) Inventors: Soo Chang Lee, Gyeonggi-do (KR); Kyung Hee Oh, Gyeonggi-do (KR)

(73) Assignee: INTEROJO INC., Gyeonggi-do (KR)

( * ) Notice: Subject to any disclaimer, the term of this patent is extended or adjusted under 35 U.S.C. 154(b) by 0 days.

(21) Appl. No.: 15/309,753

(22) PCT Filed: May 8, 2015

(86) PCT No.: PCT/KR2015/004656
§ 371 (c)(1),
(2) Date: Nov. 8, 2016

(87) PCT Pub. No.: WO2015/170936
PCT Pub. Date: Nov. 12, 2015

(65) Prior Publication Data
US 2017/0146823 A1 May 25, 2017

(30) Foreign Application Priority Data

May 9, 2014 (KR) .................. 10-2014-0055401

(51) Int. Cl.
*G02B 1/04* (2006.01)
*G02C 7/04* (2006.01)
*C08J 7/04* (2006.01)

(52) U.S. Cl.
CPC ............. *G02C 7/049* (2013.01); *C08J 7/04* (2013.01); *C08J 7/047* (2013.01); *G02B 1/04* (2013.01);
(Continued)

(58) Field of Classification Search
CPC .......... G02C 7/049; C08J 7/047; G02B 1/043
(Continued)

(56) References Cited

U.S. PATENT DOCUMENTS 8,480,227 B2   7/2013   Qiu et al.
8,557,334 B2   10/2013  Samuel et al.
(Continued)

FOREIGN PATENT DOCUMENTS

CN   1072696 A    6/1993
CN   102803273 A  11/2012
(Continued)

OTHER PUBLICATIONS

Mark van Seek, Andrea Weeks, Lyndon Jones & Heather Sheardown {2008} immobilized hyaluronic acid containing modal silicone hydrogels reduce protein adsorption . . . Journal of Biomaterials Science. Polymer edition, 19:11,1425-1436.*
(Continued)

*Primary Examiner* — James R Greece
(74) *Attorney, Agent, or Firm* — McCoy Russell LLP

(57) ABSTRACT

The present invention relates to a hydrogel contact lens having a wet surface, and a manufacturing method therefor and, more specifically, to a hydrogel contact lens and a manufacturing method therefor wherein the hydrogel contact lens satisfies basic physical properties of a hydrogel contact lens and has excellent wettability by forming a hydrophilic surface layer of an interpenetrating polymer network (IPN) structure on a surface of the hydrogel contact lens.

3 Claims, 2 Drawing Sheets

(52) U.S. Cl.
CPC .............. *G02B 1/043* (2013.01); *G02C 7/04* (2013.01); *C08J 2333/14* (2013.01); *C08J 2343/04* (2013.01); *G02B 2207/109* (2013.01); *G02C 2202/16* (2013.01)

(58) Field of Classification Search
USPC ........................................ 351/159.02, 159.33
See application file for complete search history.

(56) References Cited

U.S. PATENT DOCUMENTS

| | | | |
|---|---|---|---|
| 2003/0008063 A1* | 1/2003 | Chabrecek | A61L 27/34 427/2.1 |
| 2011/0134387 A1* | 6/2011 | Samuel | G02B 1/043 351/159.33 |
| 2012/0026457 A1* | 2/2012 | Qiu | G02B 1/043 351/159.33 |
| 2013/0303695 A1 | 11/2013 | Sheardown et al. | |
| 2014/0055741 A1 | 2/2014 | Havenstrite et al. | |

FOREIGN PATENT DOCUMENTS

| | | |
|---|---|---|
| CN | 103038699 A | 4/2013 |
| JP | H08504841 A | 5/1996 |
| JP | H09506665 A | 6/1997 |
| JP | 2004507588 A | 3/2004 |
| JP | 2005218780 A | 8/2005 |
| JP | 2008080153 A | 4/2008 |
| JP | 2009223158 A | 10/2009 |
| JP | 2012037647 A | 2/2012 |
| JP | 2013513135 A | 4/2013 |
| JP | 2013533517 A | 8/2013 |
| JP | 2013533518 A | 8/2013 |
| KR | 100594414 B1 | 7/2006 |
| KR | 1020070067679 A | 6/2007 |
| KR | 100748397 B1 | 8/2007 |
| KR | 1020090115165 A | 11/2009 |
| KR | 1020130014626 A | 2/2013 |
| KR | 101249705 B1 | 4/2013 |

OTHER PUBLICATIONS

Kim, H. et al., "A Study on Improvement of Wettability and Comfort in Contact lens with Hyaluronic acid," Journal of Korean Ophthalmic Optics Society, vol. 16, No. 3, Sep. 17, 2011, 11 pages. (Submitted with English Translation of Abstract).
ISA Korean Intellectual Property Office, International Search Report and Written Opinion Issued in Application No. PCT/KR2015/004656, dated May 19, 2015, WIPO, 4 pages.
Van Beek, M. et al.,"Immobilized hyaluronic acid containing model silicone hydrogels reduce protein adsorption," Journal of Biomaterials Science Polymer Edition, vol. 19, No. 11, Nov. 1, 2008, 14 pages.
Weeks, A. et al., "Physical Entrapment of Hyaluronic Acid During Synthesis Results in Extended Release From Model Hydrogel and Silicone Hydrogel Contact Lens Materials," Eye & Contact Lens, vol. 39, No. 2, Mar. 1, 2013, 8 pages.
European Patent Office, Extended European Search Report Issued in Application No. 15789300.9, dated Nov. 14, 2017, Germany, 13 pages.
Japanese Patent Office, Office Action Issued in Application No. 2017511130, dated Oct. 18, 2017, 6 pages. (Submitted with Machine Translation).
State Intellectual Property Office of the People's Republic of China, Office Action and Search Report Issued in Application No. 201580024298.2, dated Sep. 7, 2018, 15 pages. (Submitted with Partial Translation).
Japanese Patent Office, Office Action Issued in Application No. 2017-511130, dated Jun. 27, 2018, 9 pages.

* cited by examiner

HYDROGEL CONTACT LENS HAVING WET SURFACE, AND MANUFACTURING METHOD THEREFOR

CROSS-REFERENCE TO RELATED APPLICATIONS

The present application is a U.S. National Phase of International Patent Application Serial No. PCT/KR2015/004656, entitled "HYDROGEL CONTACT LENS HAVING WET SURFACE, AND MANUFACTURING METHOD THEREFOR," filed on May 8, 2015. International Patent Application Serial No. PCT/KR2015/004656 claims priority to Korean Patent Application No. 10-2014-0055401, filed on May 9, 2014. The entire contents of each of the above-cited applications are hereby incorporated by reference for all purposes.

TECHNICAL FIELD

The present invention relates to a hydrogel contact lens having a wet surface, and a manufacturing method therefor, and more specifically, to a hydrogel contact lens that satisfies basic physical properties as the hydrogel contact lens and that has excellent wettability by forming a hydrophilic surface layer having an interpenetrating polymer network (IPN) structure on a surface of the hydrogel contact lens, and a manufacturing method therefor.

BACKGROUND ART

A contact lens directly contact an eyeball, such that it is required to maintain transparency and surface wettability while simultaneously maintaining eye safety and efficacy, and thus, oxygen needs to be appropriately supplied from the atmosphere, and carbon dioxide needs to be properly released from a cornea.

In addition, the contact lens needs to have a tear layer with smooth flow, and should be designed in consideration of a clinical aspect so as to avoid excessive friction between an eyelid and an eye surface. Further, the contact lens should satisfy conditions such as tensile strength of a material, biocompatibility, non-toxicity, optical transparency of a material, refractive index, surface wet ability, water content appropriate for the cornea, a welling rate, oxygen permeability, etc., to be used.

In general, the contact lens may be largely divided into a hard contact lens and a soft contact lens according to the material, and is classified for vision correction, treatment, cosmetic contact lens, etc., according to function. A hydrogel is a typical material of a soft contact lens that is used for purposes such as vision correction, treatment, etc. Here, most of the hydrogel contact lenses include silicone-based or acrylate-based materials as a main material.

The cornea of a human eye has no blood vessels, and has a structure in which oxygen is directly received from the external environment. However, when the contact lens is worn, the lens itself acts as a kind of barrier, which reduces oxygen permeability. A number of people prefer to wear a general hydrogel contact lens due to comfort wearability when it is worn, but the hydrogel contact lens has problems such as hypoxia (corneal edema) due to a low oxygen permeability and reduction in the wettability of a lens surface due to leaking components attached to the lens surface. Accordingly, the hydrogel contact lens requires not only superior wearability but also a high oxygen permeability, wettability, etc.

For example, when the silicone-based hydrogel contact lens is worn, oxygen is sufficiently supplied to the eye, and thus, a side effect of the corneal edema due to the hypoxia is not caused.

However, the silicone-based hydrogel contact lens has low wearability. That is, due to properties of the silicone-based hydrogel material, as a silicone content is increased, the oxygen permeability is sufficiently increased, but hydrophilicity of the lens surface is reduced. Accordingly, the silicone-based hydrogel material causes discomfort, and has problems such as eye irritation, corneal staining, attachment of the lens to the cornea, etc.

In order to overcome these disadvantages, Korean Patent No. 10-0594414 (Patent Document 001) used a method of increasing hydrophilicity by plasma surface treating the lens surface in initial first-generation silicone hydrogel contact lens products. However, this method still has low surface wettability, which causes discomfort to a wearer, and further includes a complicate process which is called a plasma surface treatment in a manufacturing process, which causes an increase in production costs.

Further, Korean Patent No. 10-0748379 (Patent Document 002) suggested a wettable silicone hydrogel lens according to Johnson & Johnson as a second-generation silicone-based hydrogel contact lens. The second-generation silicone-based hydrogel contact lens is manufactured by using a polyvinyl pyrrolidone (PVP) polymer as an internal wetting agent to increase wettability and a water content without the plasma post-processing step. However, the internal wetting agent (PVP) has worse wearability as it is slowly released out of the lens, and thus, the second-generation silicone-based hydrogel contact lens still has discomfort when it is worn.

Meanwhile, Korean Patent Laid-Open Publication No. 10-2007-0067679 (Patent Document 003) suggested a contact lens according to Asahi Kaei Aime Co., and CooperVision as a third-generation silicone-based hydrogel contact lens. The third-generation silicone-based hydrogel contact lens is manufactured by synthesizing a silicone macromer having hydrophilic property to a raw material itself. However, a high level of molecular design and a synthesis technique for the raw material are required.

Further, there are problems in that a manufacturing method for a raw material includes complicated various stages, and accordingly, stimulating residues in manufacturing the raw material are left in a final product.

In addition, a technology of increasing surface wettability has been attempted in the acrylate-based hydrogel contact lens. For example, Korean Patent No. 10-1249705 (Patent Document 004) suggested a method of modifying a contact lens surface by immersing the contact lens in an oligosaccharide solution. However, the method has a problem in that the oligosaccharide does not have sufficient physical and chemical binding force with a polymer matrix, which is released out of the lens surface.

PATENT DOCUMENT (Patent Document 001) Korean Patent No. 10-0594414

(Patent Document 002) Korean Patent No. 10-0748379

(Patent Document 003) Korean Patent Laid-Open Publication No. 10-2007-0067679

(Patent Document 004) Korean Patent No. 10-1249705

DISCLOSURE

Technical Problem

An object of the present invention is to provide a hydrogel contact lens that satisfies basic physical properties required as the hydrogel contact lens and that has an excellent wet surface.

In addition, another object of the present invention is to provide a manufacturing method for the hydrogel contact lens as described above.

Technical Solution

In one general aspect,
a hydrogel contact lens includes: a hydrogel contact lens substrate; and
a hydrophilic surface layer having an interpenetrating polymer network (IPN) structure on the hydrogel contact lens substrate,
wherein a physical intermixed layer with the hydrophilic surface layer is formed in the contact lens substrate to have a thickness of 20 nm or more.

The hydrophilic surface layer may include a hyaluronate compound, a hydrophilic monomer, and a crosslinking agent.

The hydrophilic surface layer may include 0.2 to 10 parts by weight of the hydrophilic monomer with regard to 0.05 to 2 parts by weight of the hyaluronate compound.

The crosslinking agent may have an amount of 0.001 to 0.1 mol per 1 mol of the hydrophilic monomer.

The hyaluronate compound may be one or two or more selected from the group consisting of sodium hyaluronic acid and sodium acetylated hyaluronate.

The hyaluronate compound may have a weight average molecular weight (Mw) of 50,000 to 3,000,000.

The crosslinking agent may be one or two or more selected from the group consisting of ethylene glycol dimethacrylate (EGDMA), diethylene glycol methacrylate (DEGMA), glycerol dimethacrylate (GDMA), divinylbenzene (DVB), and trimethylolpropane trimethacrylate (TMPTMA).

In another general aspect, a manufacturing method for a hydrogel contact lens includes:
a first step of preparing a hydrogel contact lens substrate; and
a second step of immersing the hydrogel contact lens substrate in a surface-modifying solution including a hyaluronate compound, a hydrophilic monomer, and a crosslinking agent.

The manufacturing method may further include: swelling the hydrogel contact lens substrate that is performed between the first step and the second step.

The second step of immersing in the surface-modifying solution may be performed for at least 1 hour, and
the surface-modifying solution may include 0.05 to 2 wt % of the hyaluronate compound, 0.2 to 10 wt % of the hydrophilic monomer, and 0.001 to 0.5 wt % of an initiator, and a residual amount of water, and the crosslinking agent may have an amount of 0.001 to 0.1 mol per 1 mol of the hydrophilic monomer.

Advantageous Effects

According to the present invention, the hydrogel contact lens may include the hydrophilic surface layer formed by surface-modification to have excellent wettability. Specifically, the sodium hyaluronate and the hydrophilic monomer that form the interpenetrating polymer network (IPN) structure through a crosslinking agent are introduced onto the surface of the contact lens, and accordingly, the physical intermixed layer is formed with a predetermined thickness between the contact lens substrate and the hydrophilic surface layer, thereby remarkably improving wettability while satisfying basic physical properties such as a water content, an oxygen permeability, mechanical strength, etc.

In addition, some of the physical properties are more improved as compared to those of the related art.

BEST MODE

Figure 1:
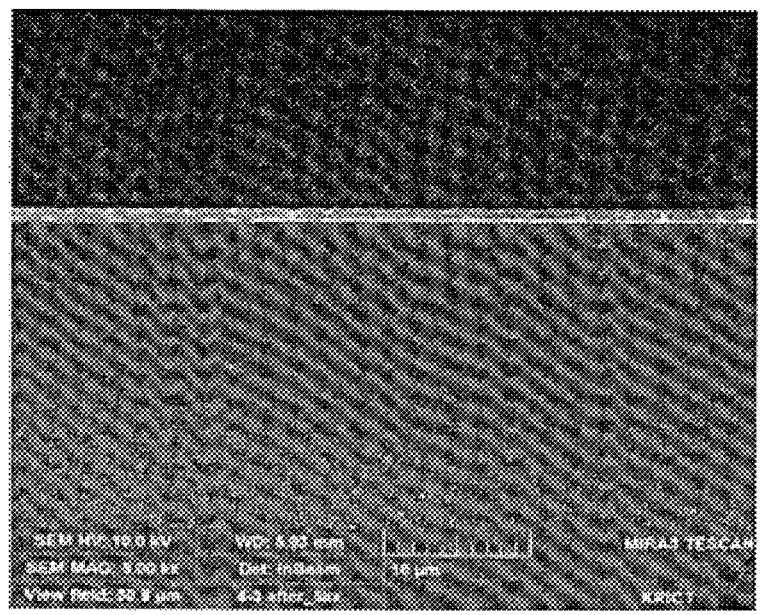
FIG. 1 is a Cryo-SEM image of a front cross section of a silicone hydrogel contact lens manufactured by an exemplary embodiment of the present invention.

Hereinafter, the present invention will be described in detail.

The present invention provides a hydrogel contact lens including a hydrogel contact lens substrate; and a hydrophilic surface layer having an interpenetrating polymer network (IPN) structure on the hydrogel contact lens substrate. Specifically, the hydrogel contact lens according to the present invention (hereinafter, abbreviated as "contact lens") has the existing conventional acrylate-based hydrogel contact lens or silicone-based hydrogel contact lens as a substrate, and includes the hydrophilic surface layer formed to have the interpenetrating polymer network (IPN) structure on a surface of the substrate, and a physical intermixed layer formed with the hydrophilic surface layer in the contact lens substrate.

Here, according to a preferable exemplary embodiment of the present invention, the hydrophilic surface layer includes a hyaluronate compound, a hydrophilic monomer, and a crosslinking agent, and has the interpenetrating polymer network (IPN) structure. Specifically, the hyaluronate compound and the hydrophilic monomer form the interpenetrating polymer network (IPN) structure on the surface of the contact lens. Hereinafter, an exemplary embodiment of the contact lens according to the present invention is provided by describing a manufacturing method for a contact lens according to the present invention.

The manufacturing method for a contact lens according to the present invention includes: a first step of preparing a hydrogel contact lens substrate; and a second step of immersing the hydrogel contact lens substrate in a surface-modifying solution including a hyaluronate compound, a hydrophilic monomer, and a crosslinking agent (a surface-modification step). In addition, the manufacturing method for a contact lens according to the present invention may further include: swelling the hydrogel contact lens substrate that is performed between the first step and the second step (a swelling step).

Each step is described as follows.

(1) Preparation of Hydrogel Contact Lens Substrate

In the present invention, the hydrogel contact lens substrate is a general hydrogel contact lens, and for example, may be selected from the existing acrylate-based hydrogel contact lens or the existing silicon-based hydrogel contact lens that is generally used as the hydrogel contact lens. In addition, in the present invention, the hydrogel contact lens substrate may be a transparent contact lens, or a colored contact lens added with pigments.

The hydrogel contact lens substrate may include a hydrophilic acrylic polymer, a hydrophilic silicone-based polymer or a hydrophilic silicone-acrylic polymer as a main material, wherein these polymers are not particularly limited as long as they are able to form the hydrogel. In addition, the hydrogel contact lens substrate may include 80 wt % or more of the polymer on the basis of a total weight. Specifically, for example, the polymer may have a content of 80 wt % to 100 wt %, 85 wt % to 99.9 wt %, or 88 wt % to 98 wt %.

Further, the hydrogel contact lens substrate may be manufactured by methods such as a cast molding method, a spin casting method, etc., but a manufacturing method for the hydrogel contact lens substrate is not particularly limited.

In one example, the hydrogel contact lens substrate is manufactured by the cast molding method, wherein a mixed solution including the hydrophilic monomer, the crosslinking agent, and an initiator may be injected into a casting mold, and may be polymerized by applying heat, and at the same time, may be molded in a lens shape. Here, the hydrophilic monomer is not particularly limited, but may be any material generally used in the art, for example, a hydrophilic acrylic monomer or a hydrophilic silicone acrylic monomer, etc.

The hydrophilic acrylic monomer may be, for example, one or more selected from the group consisting of C1-C15 hydroxyalkyl methacrylate substituted with 1 to 3 hydroxyl group(s), C1-C15 hydroxyalkyl acrylate substituted with 1 to 3 hydroxyl group(s), acrylamide, vinyl pyrrolidone, glycerol methacrylate, acrylic acid, methacrylic acid, etc. More specifically, the hydrophilic acrylic monomer may be, for example, one or more selected from the group consisting of 2-hydroxyethyl methacrylate (HEMA), N,N-dimethyl acrylamide (DMA), N-vinyl pyrrolidone (NVP), glycerol monomethacrylate (GMMA), and methacrylic acid (MAA), etc.

In addition, the hydrophilic silicone acrylic monomer may include a polydimethylsiloxane-based compound, etc. More specifically, the hydrophilic silicone acrylic monomer may be, for example, one or more selected from the group consisting of tris(3-methacryloxypropyl)silane, 2-(trimethylsilyloxy)ethyl methacrylate, 3-tris(trimethylsilyloxy)silylpropyl methacrylate, 3-methacryloxypropyl tris(trimethylsilyl)silane (MPTS), 3-methacryloxy-2-(hydroxypropyloxy) propylbis(trimethylsiloxy)methylsilane, and 4-methacryloxybutyl terminated polydimethylsiloxane, etc.

Further, the crosslinking agent may be, for example, one or more selected from the group consisting of ethylene glycol dimethacrylate (EGDMA), diethylene glycol methacrylate (DEGMA), divinylbenzene, and trimethylolpropane trimethacrylate (TMPTMA), etc. In addition, the initiator is used for the polymerization, and may be, for example, one or more selected from the group consisting of azodiisobutyronitrile (AIBN), benzoin methyl ether (BME), 2,5-dimethyl-2,5-di-(2-ethylhexanoylperoxy)hexane, and dimethoxyphenyl acetophenone (DMPA), etc.

(2) Surface-Modification (Formation of Hydrophilic Surface Layer)

The hydrogel contact lens substrate is prepared, and is surface-modified to form a hydrophilic surface layer. Here, according to a preferable exemplary embodiment, the hydrophilic surface layer includes the sodium hyaluronate compound, the hydrophilic monomer, and the crosslinking agent.

Specifically, the surface-modifying solution including the hyaluronate compound, the hydrophilic monomer, and the crosslinking agent is prepared, and the hydrogel contact lens substrate is immersed in the surface-modifying solution. More specifically, the hydrogel contact lens substrate is immersed in the surface-modifying solution in which the hyaluronate compound and the hydrophilic monomer are dissolved to thereby form the hydrophilic surface layer on the surface of the hydrogel contact lens substrate. Here, the hydrophilic monomer may form the interpenetrating polymer network (IPN) structure with the hyaluronate compound in a process in which the hydrophilic monomer is polymerized through the crosslinking agent to the hydrophilic polymer. Specifically, the hydrophilic surface layer is formed from a mixture including the hyaluronate compound, the hydrophilic monomer, and the crosslinking agent. The hydrophilic polymer formed by the crosslinking of the hydrophilic monomer forms the interpenetrating polymer network (IPN) structure with the hyaluronate compound, which is introduced onto the surface of the substrate, and the physical intermixed layer may be formed between the contact lens substrate and the hydrophilic surface layer. In the present invention, 'introduction' means that the hyaluronate compound and the hydrophilic polymer are formed into a polymer brush through a physical and chemical bond onto the surface of the contact lens, and a binding position of the hyaluronate compound and the hydrophilic polymer has no limitation.

In addition, term ⌈IPN⌋ used herein means a state in which at least two crosslinking structures are present in the hydrophilic surface layer, and in one example, the crosslinking structure may be present in a state in which the hyaluronate compound and the hydrophilic polymer formed by the polymerization of the hydrophilic monomer are entangled with each other, or linked with each other, or in a penetration state thereof. Due to the IPN structure, the hyaluronate compound and the hydrophilic polymer have chemically and physically strong bonding force, which may not be released outside, and further, a contact angle, a water content, etc., may be enhanced to provide excellent wettability, and in addition thereto, physical properties such as an oxygen permeability, Young's modulus, etc., may be enhanced.

Further, the hydrophilic surface layer may include 0.2 to 10 parts by weight of the hydrophilic monomer with regard to 0.05 to 2 parts by weight of the hyaluronate compound. Specifically, the hydrophilic surface layer may include the hyaluronate compound and the hydrophilic monomer at a weight ratio of 0.05 to 2:0.2 to 10. That is, it is preferred that the IPN structure is formed at the weight ratio of 0.05 to 2 (hyaluronate compound):0.2 to 10 (hydrophilic monomer).

Here, when a content of the hyaluronate compound is less than 0.05 part by weight, an effect in which wettability (hydrophilic property), etc., are enhanced according to use thereof, may not be significant. In addition, when the content of the hyaluronate compound is more than 2 parts by weight, for example, it may be difficult to form the IPN structure. Further, when a content of the hydrophilic monomer is less than 0.2 part by weight, it may be difficult to form an excellent IPN structure. In addition, when the content of the hydrophilic monomer is more than 10 parts by weight, for example, the effect in which wettability is enhanced, may be reduced.

In consideration of these points, it is preferred that the hydrophilic surface layer includes 0.5 to 5 parts by weight of the hydrophilic monomer with regard to 0.1 to 1 part by weight of the hyaluronate compound.

Further, in the present invention, the 'hydrophilic monomer' and the 'hydrophilic polymer' are not particularly limited as long as they have one or more hydrophilic groups in a molecule. In addition, in the present invention, the 'hydrophilic polymer' means a homopolymer and a copolymer of the hydrophilic monomer. The hydrophilic monomer may be, for example, one or more selected from the group consisting of the hydrophilic acrylic monomer, the hydrophilic silicone-acrylic monomer, etc. According to a preferable exemplary embodiment, the hydrophilic monomer may be selected from the hydrophilic acrylic monomer.

The hydrophilic acrylic monomer may be, for example, one or more selected from the group consisting of C1-C15 hydroxyalkyl methacrylate substituted with 1 to 3 hydroxyl group(s), C1-C15 hydroxyalkyl acrylate substituted with 1 to 3 hydroxyl group(s), acrylamide, vinyl pyrrolidone, glycerol methacrylate, acrylic acid, methacrylic acid, etc. More specifically, the hydrophilic acrylic monomer may be, for example, one or more selected from the group consisting of 2-hydroxyethyl methacrylate (HEMA), N,N-dimethyl acrylamide (DMA), N-vinyl pyrrolidone (NVP), glycerol monomethacrylate (GMMA), and methacrylic acid (MAA), etc. In addition, the hydrophilic polymer may be the homopolymer of the hydrophilic acrylic monomer as described above, or the copolymer of these hydrophilic acrylic monomers.

The hyaluronate (NaHA) compound is a natural polysaccharide material, and may improve wettability and provide moist wearability. In the present invention, the hyaluronate compound is not particularly limited as long as it includes a sodium hyaluronate component. The sodium hyaluronate compound may be, for example, one or more selected from the group consisting of sodium hyaluronic acid having a sodium salt form of hyaluronic acid, and sodium acetylated hyaluronate in which a hydroxyl group is partially acetylated, etc.

Further, the hyaluronate compound may be a polymer having a weight average molecular weight (Mw) ranging from 50,000 to 3,000,000. As described above, when the hyaluronate compound having a high molecular weight is used, it may be favorable to form the IPN structure with the hydrophilic polymer, which is also preferred in view of improvement of physical properties such as wettability, etc., as compared to the hyaluronate compound having a low molecular weight.

The surface-modifying solution is a solution at least including the hyaluronate compound and the hydrophilic monomer as described above, and for example, may be an aqueous solution. Specifically, the surface-modifying solution may include the hyaluronate compound, the hydrophilic monomer, the crosslinking agent, and water (distilled water).

According to an exemplary embodiment of the present invention, the crosslinking agent is able to form a strong IPN structure through the polymerization reaction together with the hyaluronate compound and the hydrophilic monomer, and may remarkably improve the effect in which wettability (hydrophilic property), etc., are enhanced. The crosslinking agent may be, for example, one or more selected from the group consisting of ethylene glycol dimethacrylate (EGDMA), diethylene glycol methacrylate (DEGMA), glycerol dimethacrylate (GDMA), divinylbenzene (DVB), and trimethylolpropane trimethacrylate (TMPTMA), etc. The crosslinking agent may have a content of 0.001 to 0.1 mol, and more preferably, 0.02 to 0.05 mol, per 1 mol of the hydrophilic monomer.

It is effective that when the content of the crosslinking agent is within the above-described range since wettability is able to be remarkably improved without deterioration of basic physical properties such as a water content, an oxygen permeability, permeability, etc. When the content of the crosslinking agent is less than 0.02 per 1 mol of the hydrophilic monomer, formation of the IPN structure is not significant, such that a moisture evaporation rate is 160 seconds or less, and accordingly, the effect in which the wettability is enhanced may not be significant. When the content of the crosslinking agent is more than 0.05 per 1 mol of the hydrophilic monomer, the formation of the IPN structure is excessively dense, and accordingly, the effect in which the wettability is enhanced may be reduced.

In addition, the surface-modifying solution may further include an initiator for the polymerization of the hydrophilic monomer. Here, the initiator is not particularly limited as long as it initiates the polymerization reaction of the hydrophilic monomer. The initiator may be, for example, selected from an azo compound, and specifically, may be, for example, one or more selected from the group consisting of azodiisobutyronitrile (AIBN), 2,2'-azobis(2-amidinopropane)dihydrochloride (ABAH), and 4,4'-azobis(4-cyanovaleric acid), etc.

Further, the initiator is a commercially available water-soluble product, and for example, may be Vazo 56WSP, and Vazo 68WSP, etc., of DuPont Company, but is not limited thereto.

According to an exemplary embodiment, the surface-modifying solution may include 0.05 to 2 wt % of the hyaluronate compound, 0.2 to 10 wt % of the hydrophilic monomer, and 0.001 to 0.5 wt % of the initiator on the basis of a total weight. In addition, when the surface-modifying solution is an aqueous solution, the surface-modifying solution may include 87.5 to 99.5% of water (distilled water) as a residual content.

In the surface-modifying solution, the crosslinking agent may have a content of 0.001 to 0.1 mol, and more preferably, 0.02 to 0.05 mol, per 1 mol of the hydrophilic monomer.

In regard to the content of each component composing the surface-modifying solution, when the content of the hyaluronate compound is less than 0.05 wt %, the effect in which the wettability (hydrophilic property), etc., are enhanced according to use thereof, may not be significant. In addition, when the content of the hyaluronate compound is more than 2 wt %, for example, the IPN structure may be destroyed. Further, when the content of the hydrophilic monomer is less than 0.2 wt %, it may be difficult to form an excellent IPN structure. In addition, when the content of the hydrophilic monomer is more than 10 wt %, for example, the effect in which the wettability is enhanced, may be reduced. Further, when the content of the initiator is less than 0.001 wt %, it may be difficult to perform the polymerization initiation reaction, and when the content of the initiator is more than 0.5 wt %, a synergy effect according to the over-use may not be large, and the molecular weight of the hydrophilic polymer may be decreased. In consideration of these points, the surface-modifying solution may include 0.1 to 1 wt % of the hyaluronate compound, 0.5 to 5 wt % of the hydrophilic monomer, and 0.005 to 0.2 wt % of the initiator on the basis of a total weight of the solution.

Further, according to an exemplary embodiment of the present invention, the hydrophilic surface layer may be formed through the immersion in the above-described surface-modifying solution, wherein the surface-modifying solution may include 0.5 to 49 wt % of the hyaluronate compound, 50 to 99.45 wt % of the hydrophilic monomer, and 0.05 to 5 wt % of the initiator on the basis of a solid content.

In addition, according to a preferable exemplary embodiment of the present invention, it is preferred that the hydrophilic surface layer (surface modification layer) has a thickness of 40 nm to 2 μm. Here, when the thickness of the hydrophilic surface layer (surface modification layer) is less than 40 nm, hydrophilic property may be low, and accordingly, the effect in which the wettability of the lens surface is enhanced, may not be significant. In addition, when the thickness of the hydrophilic surface layer (surface modification layer) is more than 2 μm, a shape of a surface-modified contact lens may be deformed, or in some cases, the oxygen permeability and optical properties are low, which may have a negative effect on the basic function that is required as the contact lens.

(3) Swelling of Hydrogel Contact Lens Substrate

Meanwhile, according to an exemplary embodiment of the present invention, a step of swelling the hydrogel contact lens substrate may be performed before the surface-modification, i.e., before forming the hydrophilic surface layer by immersion in the surface-modifying solution.

Specifically, according to an exemplary embodiment, the manufacturing method for the hydrogel contact lens according to the present invention may include: the step of preparing the hydrogel contact lens substrate; and the step of swelling the hydrogel contact lens substrate; and the step of immersing the swollen hydrogel contact lens substrate in the surface-modifying solution including the hyaluronate compound, the hydrophilic monomer, and the crosslinking agent.

The swelling may be performed by immersing the hydrogel contact lens substrate in an alcohol solution. As a specific example, the swelling may be performed by immersing the hydrogel contact lens substrate in the alcohol solution such as 20 to 60 wt % of aqueous ethanol solution, etc., for 10 minutes to 3 hours, but the swelling is not limited thereto. When the swelling is further performed, attachment force between the hydrogel contact lens substrate and the hydrophilic surface layer is improved, and the hydrophilic surface layer having the IPN structure may be effectively introduced and formed onto the surface of the hydrogel contact lens substrate.

According to an exemplary embodiment of the present invention, the swollen hydrogel contact lens substrate may be immersed in the surface-modifying solution for at least 1 hour. Preferably, it is effective that time for immersion may be 1 to 10 hours, and more preferably, 1 to 5 hours. By immersing the swollen hydrogel contact lens substrate for the above-described time, the physical intermixed layer may be formed with a dried thickness of 20 nm or more between the hydrogel contact lens substrate and the hydrophilic surface layer. When the physical intermixed layer is formed with the dried thickness of 20 nm or more, it is possible to form a more uniform and durable IPN structure, and to effectively improve wettability.

In addition, according to an exemplary embodiment of the present invention, after the surface modification is performed, i.e., after the hydrophilic surface layer is formed by immersing the hydrogel contact lens substrate in the surface-modifying solution, a washing process, a sterilization process, etc., may be further performed at least once. Here, the washing process may be performed by impregnation with deionized water. The sterilization process may be performed by using a high pressure steam sterilization method, etc.

According to the present invention as described above, the physical intermixed layer is formed on the surface of the contact lens, and at the same time, the hyaluronate and the hydrophilic polymer are introduced while having the IPN structure, such that excellent wettability is obtained while satisfying the basic physical properties required as the hydrogel contact lens. In addition, some of the physical properties are more improved as compared to those of the related art.

Hereinafter, Examples and Comparative Examples are provided. The following Examples are provided to assist in the understanding of the present invention, but should not be construed to limit the technical scope of the present invention.

In addition, a method of measuring each physical property is described as follows.

1. Measurement of Water Content

A water content (%) was evaluated by measuring a weight of a dried contact lens and a weight of a swollen contact lens after impregnating the contact lens with 0.9 wt % of sodium chloride (NaCl) aqueous solution for 24 hours, and then calculating the water content according to Equation below. That is, the water content was evaluated as a ratio of the weight of the swollen contact lens ($W_{swell}$) to the weight of the dried contact lens ($W_{dry}$).

$$\text{Water content } (\%) = (W_{swell} - W_{dry})/W_{dry} \times 100$$

2. Measurement of Oxygen Permeability (Dk)

In order to evaluate the oxygen permeability (Dk), a specimen was impregnated with a PBS solution at room temperature for 24 hours, and then, kept at 35° C.±0.5° C. which was the same as an eye temperature for at least 2 hours. In addition, the specimen was put into an incubator, and the oxygen permeability (Dk) was measured by using an oxygen permeability measurement device [Model 201T, Rehder Development Co., West Lafayette, USA] in a lens moisture saturation state under an atmosphere of temperature of 35° C.±0.5° C. and humidity of 98%.

3. Measurement of Contact Angle

A contact angle)(° was measured by a captive air bubble method using a contact angle measurement system (DSA 100).

4. Measurement of Young's Modulus

Young's modulus (Mpa) was measured by Young's modulus measurement method using a universal test machine.

5. Hydrophilic Surface Layer Stability (Rubbing Stability)

The hydrogel contact lens was washed by 30 times rubbing with an index finger using Renu-Fresh (Bausch Lomb Company) lens cleaning solution, and immersed in a clean cleansing solution for 1 hour. The washing process was repeated ten times, and then, the content of hyaluronate of the contact lens was measured by using HPLC (Agilent 1260 HPLC, C18 column, mobile phase: 0.3×PBS, acetonitrile), and was shown as a content (g) of sodium hyaluronate per the lens weight.

6. Measurement of Water Vapor Permeability (Water Evaporation Rate)

The hydrogel contact lens was swollen in 0.9 wt % sodium chloride aqueous solution for 5 hours, and then, excess water remaining on the lens surface layer was removed by a Whatman Filter paper No. 1. The lens from which water was removed was fixed to a polypropylene convex mold, and placed on an electronic scale installed in a thermo-hygrostat at a temperature of 35° C. and 30% relative humidity. The weight of the lens was measured every 10 seconds, and time at which the water content of the lens was reduced by 10% was repeatedly measured five times, and then, an average value thereof was obtained.

7. Measurement of Thickness of Physical Intermixed Layer

The manufactured lens specimen was subjected to XPS (X-ray photoelectron spectroscopy) analysis. ESCALAB 220i XL (Thermo VG Scientific) was used as analysis equipment, and a magnesium X-ray source (hv=1253.6 eV) in an ultra vacuum state of $10^{-7}$ Pa was used, and photoelectrons emitted at an angle of 45 degrees on the surface under condition of 15 kV and 25 W, were detected. At the same time, thickness profile was obtained through ion sputtering, and specifically, sputtering was performed with $Ar^+$ ions in 1 kV voltage at an incident angle of 70 degrees with regard to a vertical direction of the sample. $Ar^+$ ion sputtering was performed at 1 minute interval, and C1 s XPS spectrum was obtained at 1 minute interval, and then, surface composition was calculated according to each functional group. A section area in which the surface composition of the polymer forming the hydrophilic surface layer was changed from 95 wt % to 5 wt %, was calculated as the thickness of the physical intermixed layer.

Manufacturing Example 1

<Manufacture of Acrylate-Based Hydrogel Contact Lens Substrate>

98 g of 2-hydroxyethyl methacrylate (HEMA) and 1.6 g of methacrylic acid (MAA) were mixed as the hydrophilic acrylate monomer, and then, 0.4 g of ethylene glycol dimethacrylate (EGDMA) as the crosslinking agent, and 0.5 g of azodiisobutyronitrile (AIBN) as the initiator were added thereto, followed by stirring for 30 minutes, thereby preparing a mixed solution.

The prepared mixed solution was injected into a female mold for cast molding, and a male mold was assembled in the female mold. Next, the assembled mold was put into a heat oven maintained at 100° C., and polymerized for 2 hours, and then, the mold was separated to obtain a lens. The obtained lens was put in an aqueous solution including sodium bicarbonate, followed by hydration, thereby manufacturing an acrylate hydrogel contact lens. (Manufacture of acrylate-based hydrogel contact lens substrate) Physical properties (water content, Young's modulus, and contact angle) of the above-manufactured acrylate hydrogel contact lens (acrylate-based hydrogel contact lens substrate) were evaluated, and results thereof were shown in [Table 1] below.

Manufacturing Example 2

<Manufacture of Silicone-Based Hydrogel Contact Lens Substrate>

50 g of 3-methacryloxy-2-(hydroxypropyloxy)propylbis(trimethylsiloxy)methylsilane (SiGMA, Gelest Company), 20 g of N,N-dimethyl acrylamide (DMA), and 20 g of N-vinyl pyrrolidone (NVP) were mixed as the silicone acrylate monomer, and then, 0.4 g of ethylene glycol dimethacrylate (EGDMA) as the crosslinking agent, and 0.5 g of azodiisobutyronitrile (AIBN) as the initiator were added thereto, followed by stirring for 30 minutes, thereby preparing a mixed solution.

The prepared mixed solution was injected into a female mold for cast molding, and a male mold was assembled in the female mold. Next, the assembled mold was put into a heat oven maintained at 100° C., and polymerized for 2 hours, and then, the mold was separated to obtain a lens. The obtained lens was sequentially put in 70% aqueous ethanol solution and deionized water, followed by hydration, thereby manufacturing a silicone hydrogel contact lens. (Manufacture of silicone-based hydrogel contact lens substrate)

Physical properties (water content, Young's modulus, and contact angle) of the above-manufactured silicone hydrogel contact lens (silicone-based hydrogel contact lens substrate) were evaluated, and results thereof were shown in [Table 1] below.

TABLE 1

| | Physical properties of contact lens substrate | | |
|---|---|---|---|
| | Water content (%) | Young's modulus (MPa) | Contact angle (°) |
| Manufacturing Example 1 | 55 | 0.64 | 34 |
| Manufacturing Example 2 | 40 | 1.20 | 49 |

Example 1

As shown in [Table 2] below, the silicone hydrogel contact lens substrate manufactured in Manufacturing Example 2 was immersed in 40 wt % aqueous ethanol solution, and swollen for 1 hour. Then, the contact lens was immersed in the surface-modifying solution, and reacted at 80° C. for 1 hour, such that the surface was modified (the hydrophilic surface layer was formed on the surface of the substrate). As the surface-modifying solution, the hyaluronate compound, the hydrophilic monomer, the crosslinking agent, and the water-soluble initiator, were mixed in distilled water to be used.

Then, after the modification was completed, the lens was washed for 2 hours with 80° C. deionized water, and sterilized by a high pressure steam sterilization method at 121° C. for 20 minutes, thereby finally manufacturing the surface-modified silicone hydrogel contact lens. As described above, the physical properties of the obtained silicone hydrogel contact lens were evaluated, and results thereof were shown in [Table 3] below.

Examples 2 to 3

As shown in [Table 2] below, the silicone hydrogel contact lens was manufactured by the same method as Example 1 except that the content of the crosslinking agent was changed in the surface-modifying solution. The physical properties of the obtained product were evaluated, and results thereof were shown in [Table 3] below.

Example 4

As shown in [Table 2] below, the acrylate-based hydrogel contact lens substrate manufactured in Manufacturing Example 1 was immersed in 40 wt % aqueous ethanol solution, and swollen for 1 hour. Then, the contact lens was immersed in the surface-modifying solution, and reacted at 80° C. for 1 hour, such that the surface was modified (the hydrophilic surface layer was formed on the surface of the substrate). As the surface-modifying solution, the hyaluronate compound, the hydrophilic acrylate monomer, and the water-soluble initiator, were mixed in distilled water to be used.

Then, after the modification was completed, the lens was washed for 2 hours with 80° C. deionized water, and sterilized by a high pressure steam sterilization method at 121° C. for 20 minutes, thereby finally manufacturing the surface-modified acrylate-based hydrogel contact lens. As described above, the physical properties of the obtained acrylate-based hydrogel contact lens were evaluated, and results thereof were shown in [Table 3] below.

Examples 5 to 6

As shown in [Table 2] below, the silicone hydrogel contact lens was manufactured by the same method as Example 1 except that the time for immersion in the surface-modifying solution was changed. Physical properties of the obtained product were evaluated, and results thereof were shown in [Table 3] below.

Examples 7 to 8

As shown in [Table 2] below, the silicone hydrogel contact lens was manufactured by the same method as Example 1 except that the hydrophilic monomer was changed in the surface-modifying solution. Physical properties of the obtained product were evaluated, and results thereof were shown in [Table 3] below.

Examples 9 to 10

As shown in [Table 2] below, the acrylate-based hydrogel contact lens was manufactured by the same method as Example 4 except that the hydrophilic monomer was changed in the surface-modifying solution. Physical properties of the obtained product were evaluated, and results thereof were shown in [Table 3] below.

Comparative Example 1

The acrylate-based hydrogel contact lens substrate manufactured in Manufacturing Example 1 was used as a specimen of Comparative Example 1. That is, the specimen of Comparative Example 1 was the acrylate hydrogel contact lens before the surface modification.

Comparative Example 2

The silicone hydrogel contact lens substrate manufactured in Manufacturing Example 2 was used as the specimen of Comparative Example 2. That is, the specimen of Comparative Example 2 was the silicone hydrogel contact lens before the surface modification.

Comparative Example 3

As shown in [Table 2] below, the silicone hydrogel contact lens substrate manufactured in Manufacturing Example 2 was immersed in 40 wt % aqueous ethanol solution, and swollen for 1 hour. Then, the contact lens was immersed in the surface-modifying solution, and reacted at 80° C. for 1 hour, such that the surface was modified (the hydrophilic surface layer was formed on the surface of the substrate). As the surface-modifying solution, the hyaluronate compound was mixed in distilled water to be used.

Then, after the modification was completed, the lens was washed for 2 hours with 80° C. deionized water, and sterilized by a high pressure steam sterilization method at 121° C. for 20 minutes, thereby finally manufacturing the surface-modified silicone hydrogel contact lens. As described above, the physical properties of the obtained silicone hydrogel contact lens were evaluated, and results thereof were shown in [Table 3] below.

Comparative Examples 4 to 5

As shown in [Table 2] below, the silicone hydrogel contact lens was manufactured by the same method as Example 1 except that the content of the crosslinking agent was changed in the surface-modifying solution. Physical properties of the obtained product were evaluated, and results thereof were shown in [Table 3] below.

Comparative Example 6

As shown in [Table 2] below, the silicone hydrogel contact lens was manufactured by the same method as Example 1 except that the time for immersion in the surface-modifying solution was changed. Physical properties of the obtained product were evaluated, and results thereof were shown in [Table 3] below.

TABLE 2

|  | Composition (weight ratio) of surface-modifying solution | Crosslinking agent (mol) | Time for immersion in ethanol | Time for immersion in surface-modifying solution | Substrate |
|---|---|---|---|---|---|
| Example 1 | NVP (1), NaHA (0.2), Vazo 56WSP (0.01), Distilled water (98.75) | GDMA 0.022 | 1 hour | 1 hour | Silicone |
| Example 2 | NVP (1), NaHA (0.2), Vazo 56WSP (0.01), Distilled water (98.73) | GDMA 0.034 | 1 hour | 1 hour | Silicone |
| Example 3 | NVP (1), NaHA (0.2), Vazo 56WSP (0.01), Distilled water (98.715) | GDMA 0.042 | 1 hour | 1 hour | Silicone |
| Example 4 | NVP (1), NaHA (0.2), Vazo 56WSP (0.01), Distilled water (98.79) | GDMA 0.022 | 1 hour | 1 hour | Acrylate |

TABLE 2-continued

|  | Composition (weight ratio) of surface-modifying solution | Crosslinking agent (mol) | Time for immersion in ethanol | Time for immersion in surface-modifying solution | Substrate |
|---|---|---|---|---|---|
| Example 5 | NVP (1), NaHA (0.2), Vazo 56WSP (0.01), Distilled water (98.79) | GDMA 0.022 | 1 hour | 2 hour | Acrylate |
| Example 6 | NVP (1), NaHA (0.2), Vazo 56WSP (0.01), Distilled water (98.79) | GDMA 0.022 | 1 hour | 4 hour | Acrylate |
| Example 7 | HEMA (1), NaHA (0.2), Vazo 56WSP (0.01), Distilled water (98.75) | GDMA 0.026 | 1 hour | 1 hour | Silicone |
| Example 8 | GMMA (1), NaHA (0.2), Vazo 56WSP (0.01), Distilled water (98.75) | GDMA 0.040 | 1 hour | 1 hour | Silicone |
| Example 9 | HEMA (1), NaHA (0.2), Vazo 56WSP (0.01), Distilled water (98.75) | GDMA 0.026 | 1 hour | 1 hour | Acrylate |
| Example 10 | GMMA (1), NaHA (0.2), Vazo 56WSP (0.01), Distilled water (98.75) | GDMA 0.040 | 1 hour | 1 hour | Acrylate |
| Comparative Example 1 | Before surface-modification (Manufacturing Example 1) | — | — | — | Acrylate |
| Comparative Example 2 | Before surface-modification (Manufacturing Example 2) | — | — | — | Silicone |
| Comparative Example 3 | NaHA (0.2), Distilled water (98.79) | — | 1 hour | 1 hour | Silicone |
| Comparative Example 4 | NVP (1), NaHA (0.2), Vazo 56WSP (0.01), Distilled water (98.76) | GDMA 0.017 | 1 hour | 1 hour | Silicone |
| Comparative Example 5 | NVP (1), NaHA (0.2), Vazo 56WSP (0.01), Distilled water (98.70) | GDMA 0.051 | 1 hour | 1 hour | Silicone |
| Comparative Example 6 | NVP (1), NaHA (0.2), Vazo 56WSP (0.01), Distilled water (98.79) | GDMA 0.017 | 1 hour | 0.5 hour | Acrylate |

NVP: N-vinyl pyrrolidone
GDMA: glycerol dimethacrylate
NaHA: sodium hyaluronate, weight average molecular weight 1.2 million
Vazo 56WSP: water-soluble thermal initiator (DuPont)
Content of crosslinking agent: A molar ratio of crosslinking agent added per 1 mole of hydrophilic monomer

TABLE 3

|  | Water content (%) | Oxygen permeability (Dk) | Young's modulus (MPa) | Contact angle (°) | Stability of hydrophilic surface layer (NaHA mg/g) | Moisture evaporation rate (sec) | Thickness of surface layer (μm) | Dried thickness of physical intermixed layer (nm) |
|---|---|---|---|---|---|---|---|---|
| Example 1 | 42 | 108 | 0.76 | 32 | 0.54 | 209 | 1.30 | 55 |
| Example 2 | 43 | 109 | 0.75 | 32 | 0.71 | 215 | 1.25 | 58 |
| Example 3 | 44 | 110 | 0.77 | 30 | 0.87 | 211 | 1.32 | 53 |
| Example 4 | 57 | 23 | 0.50 | 28 | 0.56 | 192 | 1.54 | 60 |
| Example 5 | 58 | 25 | 0.47 | 26 | 0.67 | 215 | 1.87 | 85 |
| Example 6 | 60 | 28 | 0.42 | 23 | 0.78 | 240 | 2.10 | 102 |
| Example 7 | 44 | 110 | 0.75 | 32 | 0.53 | 210 | 1.25 | 45 |
| Example 8 | 45 | 111 | 0.71 | 32 | 0.83 | 208 | 1.24 | 79 |
| Example 9 | 58 | 25 | 0.45 | 28 | 0.64 | 206 | 1.52 | 59 |

TABLE 3-continued

| | Water content (%) | Oxygen permeability (Dk) | Young's modulus (MPa) | Contact angle (°) | Stability of hydrophilic surface layer (NaHA mg/g) | Moisture evaporation rate (sec) | Thickness of surface layer (μm) | Dried thickness of physical intermixed layer (nm) |
|---|---|---|---|---|---|---|---|---|
| Example 10 | 57 | 27 | 0.43 | 26 | 0.89 | 220 | 1.75 | 88 |
| Comparative Example 1 | 55 | 22 | 0.64 | 34 | — | 80 | — | — |
| Comparative Example 2 | 40 | 110 | 1.20 | 49 | — | 60 | — | — |
| Comparative Example 3 | 40 | 110 | 0.79 | 32 | 0.02 | 180 | 0.57 | 10 |
| Comparative Example 4 | 42 | 110 | 0.77 | 35 | 0.25 | 160 | 1.11 | 54 |
| Comparative Example 5 | 40 | 110 | 0.78 | 37 | 0.75 | 170 | 1.25 | 55 |
| Comparative Example 6 | 58 | 25 | 0.70 | 45 | 0.21 | 198 | 0.78 | 16 |

As shown in [Table 3] above, it could be appreciated that the contact angle, the water content, the Young's modulus, and the oxygen permeability of the lens specimens (after the surface modification) according to the respective Examples were generally excellent as compared to the lens specimens (before the surface modification) according to the respective Comparative Examples. In addition, it could be appreciated that the moisture evaporation rate, the thickness of the hydrophilic surface layer, and the thickness of the physical intermixed layer were also excellent.

It is determined that these characteristics were shown in the specimens according to the respective Examples since the sodium hyaluronate and the hydrophilic acrylic polymer formed the hydrophilic surface layer (surface modification layer) with the interpenetrating polymer network (IPN) structure on the contact lens surface. In addition, it could be appreciated that when the crosslinking agent had the specific content, remarkable effect was obtained.

In addition, it could be appreciated that as the time for immersion in the surface-modifying solution was increased, the thickness of the physical intermixed layer was thickened, and accordingly, the Young's modulus was reduced, which increased a soft property, such that wearability of the contact lens was improved.

As shown in Comparative Example 6, it could be appreciated that when the time for immersion in the surface-modifying solution was less than 1 hour, the thickness of the physical intermixed layer was less than 20 nm, and the formation of the IPN structure was also insignificant, such that the thickness of the hydrophilic surface layer was also thin, which reduced wettability.

Figure 2:
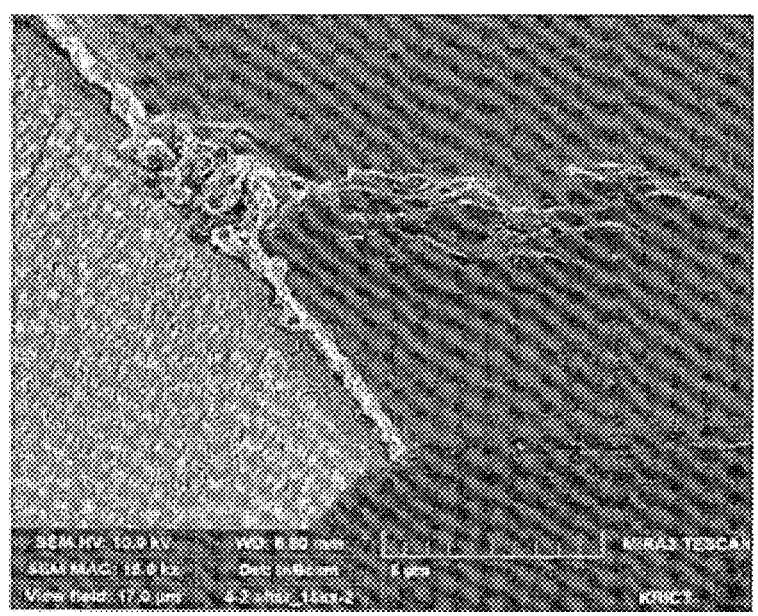
FIG. 2 is a Cryo-SEM image of a side cross section of the silicone hydrogel contact lens manufactured by an exemplary embodiment of the present invention.
Figure 3:
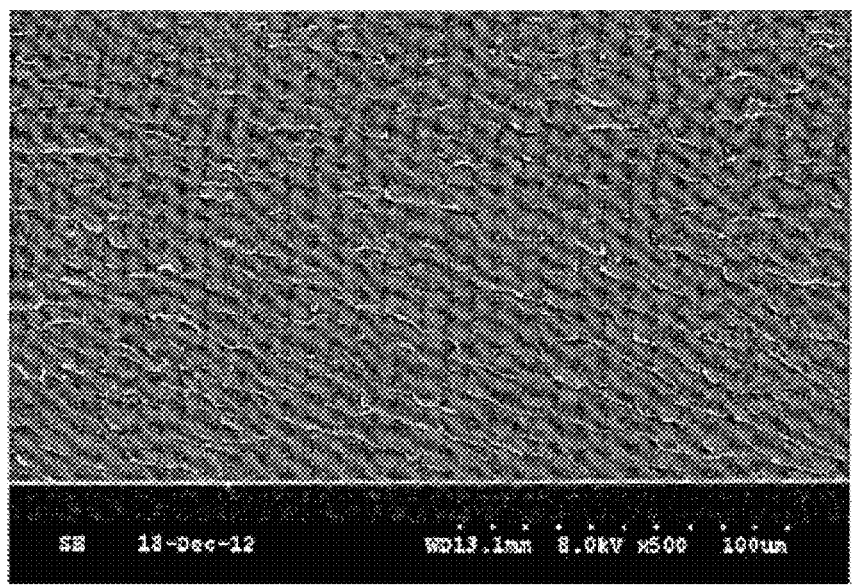
FIG. 3 is a scanning electron microscope (SEM) image of a surface of the silicone hydrogel contact lens manufactured by an exemplary embodiment of the present invention.
Figure 4:
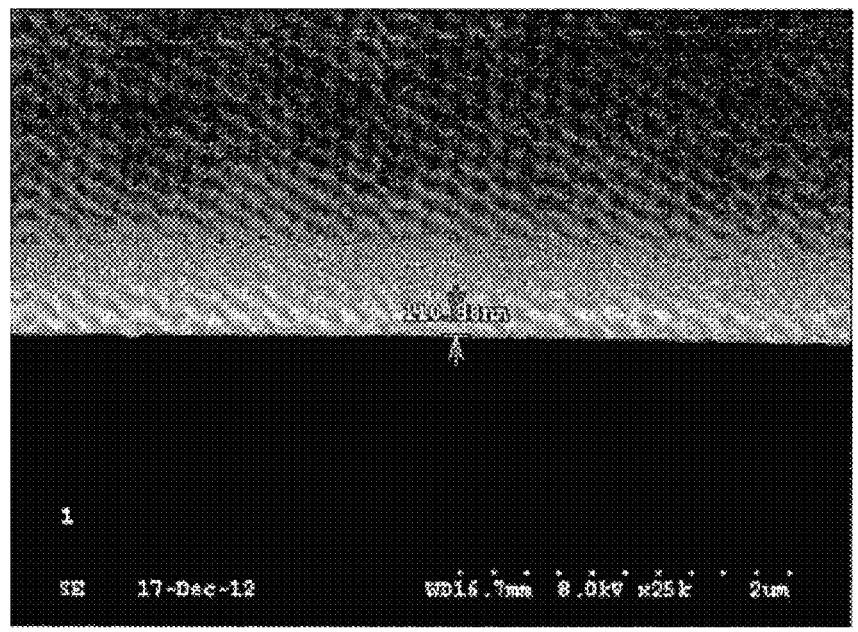
FIG. 4 is a scanning electron microscope (SEM) image of a cross section of the silicone hydrogel contact lens manufactured by an exemplary embodiment of the present invention.

The attached FIGS. 1 and 2 are Cryo-SEM images of cross sections of the silicone hydrogel contact lenses according to an exemplary embodiment of the present invention, and FIGS. 3 and 4 are SEM images of the surface and the cross section of the silicone hydrogel contact lenses according to an exemplary embodiment of the present invention.

As shown in Tables 1 to 4, it could be confirmed that the sodium hyaluronate and the hydrophilic acrylic polymer formed the hydrophilic surface layer (surface modification layer) with the interpenetrating polymer network (IPN) structure on the contact lens surface.

As confirmed in the above-described experimental Examples, it could be confirmed that when not only the surface of the acrylate-based hydrogel contact lens but also the surface of the silicone-based hydrogel contact lens were formed with the hydrophilic surface layer having the IPN structure and the physical intermixed layer, wettability of the lens surface was remarkably increased, and general physical properties such as the water content, the oxygen permeability, the Young's modulus, etc., were also improved.

The invention claimed is:

1. A manufacturing method for a hydrogel contact lens comprising a hydrogel contact lens substrate and a hydrophilic surface layer having an interpenetrating polymer network (IPN) structure formed on a surface of the hydrogel contact lens substrate, comprising:
    a first step of preparing the hydrogel contact lens substrate; and
    a second step of immersing the hydrogel contact lens substrate for at least 1 hour in a single surface-modifying solution including 0.05 to 2 wt % of a sodium hyaluronate compound, 0.2 to 10 wt % of a hydrophilic monomer, a crosslinking agent having a content of 0.001 to 0.1 mol per 1 mol of the hydrophilic monomer, 0.001 to 0.5 wt % of an initiator, and a residual content of water,
    wherein a physical intermixed layer with the hydrophilic surface layer is formed in the contact lens substrate to have a thickness of 20 nm or more, and
    wherein the hydrophilic surface layer having the interpenetrating polymer network (IPN) structure is formed from a single mixture including the sodium hyaluronate compound, the hydrophilic monomer, and the crosslinking agent.

2. The manufacturing method of claim 1, further comprising:
    swelling the hydrogel contact lens substrate that is performed between the first step and the second step.

3. The manufacturing method of claim 2, wherein the swelling is performed by immersing the hydrogel contact lens substrate in an alcohol solution.

* * * * *